(12) United States Patent
Uchida

(10) Patent No.: US 9,031,239 B2
(45) Date of Patent: May 12, 2015

(54) INFORMATION PROCESSING APPARATUS, INFORMATION PROCESSING METHOD, AND COMPUTER READABLE STORAGE MEDIUM

(71) Applicant: Fujitsu Limited, Kawasaki-shi, Kanagawa (JP)

(72) Inventor: Yoshiaki Uchida, kawasaki (JP)

(73) Assignee: Fujitsu Limited, Kawasaki (JP)

( * ) Notice: Subject to any disclaimer, the term of this patent is extended or adjusted under 35 U.S.C. 154(b) by 9 days.

(21) Appl. No.: 13/966,758

(22) Filed: Aug. 14, 2013

(65) Prior Publication Data

US 2014/0161259 A1   Jun. 12, 2014

Related U.S. Application Data

(63) Continuation of application No. PCT/JP2011/052782, filed on Feb. 9, 2011.

(51) Int. Cl.
| | |
|---|---|
| *G06F 21/00* | (2013.01) |
| *G06F 12/14* | (2006.01) |
| *H04N 21/2347* | (2011.01) |
| *H04N 21/4405* | (2011.01) |
| *H04L 9/08* | (2006.01) |
| *H04L 9/14* | (2006.01) |

(52) U.S. Cl.
CPC ........ *G06F 12/1408* (2013.01); *H04N 21/2347* (2013.01); *H04N 21/4405* (2013.01); *H04L 9/0816* (2013.01); *H04L 9/0825* (2013.01); *H04L 9/14* (2013.01); *H04L 2209/046* (2013.01); *H04L 2209/60* (2013.01); *G06F 21/00* (2013.01)

(58) Field of Classification Search
USPC ................... 380/210, 268, 277, 284
See application file for complete search history.

(56) References Cited

U.S. PATENT DOCUMENTS

| | | | |
|---|---|---|---|
| 5,577,123 A | | 11/1996 | Shimada |
| 6,073,236 A | * | 6/2000 | Kusakabe et al. ............. 713/169 |

(Continued)

FOREIGN PATENT DOCUMENTS

| | | |
|---|---|---|
| JP | 5-130098 | 5/1993 |
| JP | 7-225551 | 8/1995 |

(Continued)

OTHER PUBLICATIONS

"Enhancing selective encryption for H. 264/AVC using advanced encryption standard"; M Abomhara et al; Journal of Computer theory and engineering, 2010; 7 pages.*
International Search Report, mailed in connection with PCT/JP2011/052782 and mailed Mar. 8, 2011.

*Primary Examiner* — Jason Lee
(74) *Attorney, Agent, or Firm* — Fujitsu Patent Center

(57) ABSTRACT

An information processing apparatus includes an encrypting unit that encrypts a value to be kept secret with a predetermined cipher key. The information processing apparatus includes a converting unit that converts, when the value to be kept secret is an initial value written at the time of initialization of a storage device in which a value encrypted by the encrypting unit is stored, the value encrypted by the encrypting unit into a value which is reversibly convertible and is independent of the cipher key used by the encrypting unit. The information processing apparatus includes a storing unit that stores the value converted by the converting unit in the storage device.

3 Claims, 7 Drawing Sheets

(56) References Cited

U.S. PATENT DOCUMENTS

| | | | |
|---|---|---|---|
| 6,333,983 B1 * | 12/2001 | Enichen et al. | 380/273 |
| 6,363,148 B1 | 3/2002 | Sako | |
| 6,807,365 B1 | 10/2004 | Aoki | |
| 6,975,730 B1 * | 12/2005 | Kuroiwa et al. | 380/284 |
| 8,036,377 B1 * | 10/2011 | Poo et al. | 380/28 |
| 8,112,634 B2 * | 2/2012 | Aciicmez et al. | 713/189 |
| 2008/0247547 A1 * | 10/2008 | Ikushima et al. | 380/268 |

FOREIGN PATENT DOCUMENTS

| | | |
|---|---|---|
| JP | 10-164049 | 6/1998 |
| JP | 2000-341632 | 12/2000 |
| JP | 2003-115831 | 4/2003 |
| JP | 2008-035305 | 2/2008 |

* cited by examiner

FIG.2

| ADDRESS | 0x00 | 0x08 | 0x10 |
|---|---|---|---|
| RESULT OF ENCRYPTION BY FIRST ENCRYPTING UNIT | 1201, 04AF, 98A3, 31B3 | 1934, A41C, 1298, B013 | 1934, A41C, 1298, B013 |
| RESULT OF ENCRYPTION BY SECOND ENCRYPTING UNIT | 1934, A41C, 1298, B013 | 1934, A41C, 1298, B013 | 1934, A41C, 1298, B013 |
| MEMORY DATA | 0B35, A0B3, 8A3B, 81A0 | 0000, 0000, 0000, 0000 | 0000, 0000, 0000, 0000 |
| VALUE SEEN FROM CPU | E5, 00, 00, 00, 00, 00, 00, 00 | 00, 00, 00, 00, 00, 00, 00, 00 | 00, 00, 00, 00, 00, 00, 00, 00 |

FIG.3

| MANAGEMENT NUMBER | MANAGEMENT ID | PERMISSION FLAG | NUMBER OF COPYINGS | EXPIRATION DATE | NAME | CIPHER KEY |
|---|---|---|---|---|---|---|
| 0 | all 0 | all 0 | all 0 | all 0 | all 0 | all 0 |
| 1 | all 0 | all 0 | all 0 | all 0 | all 0 | all 0 |
| 2 | all 0 | all 0 | all 0 | all 0 | all 0 | all 0 |
| 3 | all 0 | all 0 | all 0 | all 0 | all 0 | all 0 |
| 4 | all 0 | all 0 | all 0 | all 0 | all 0 | all 0 |

FIG.4

| MANAGEMENT NUMBER | MANAGEMENT ID | PERMISSION FLAG | NUMBER OF COPYINGS | EXPIRATION DATE | NAME | CIPHER KEY |
|---|---|---|---|---|---|---|
| 0 | xxxx | xxxx | xxxx | xxxx | xxxx | xxxx |
| 1 | ID OF a | FLAG OF a | NUMBER OF COPYINGS OF a | 2011/10/20 | xxxx | xaaaaax |
| 2 | ID OF b | FLAG OF b | NUMBER OF COPYINGS OF b | 2012/6/20 | xxxx | xbbbbbx |
| 3 | ID OF c | FLAG OF c | NUMBER OF COPYINGS OF c | 2011/4/20 | xxxx | xccccx |
| 4 | all 0 | all 0 | all 0 | all 0 | all 0 | all 0 |

FIG.5

| ADDRESS | 0x00 | 0x08 | 0x10 |
|---|---|---|---|
| MEMORY DATA | 1201, 04AF, 98A3, 31B3 | 1934, A41C, 1298, B013 | 1934, A41C, 1298, B013 |
| VALUE SEEN FROM CPU | E5, 00, 00, 00, 00, 00, 00, 00 | 00, 00, 00, 00, 00, 00, 00, 00 | 00, 00, 00, 00, 00, 00, 00, 00 |

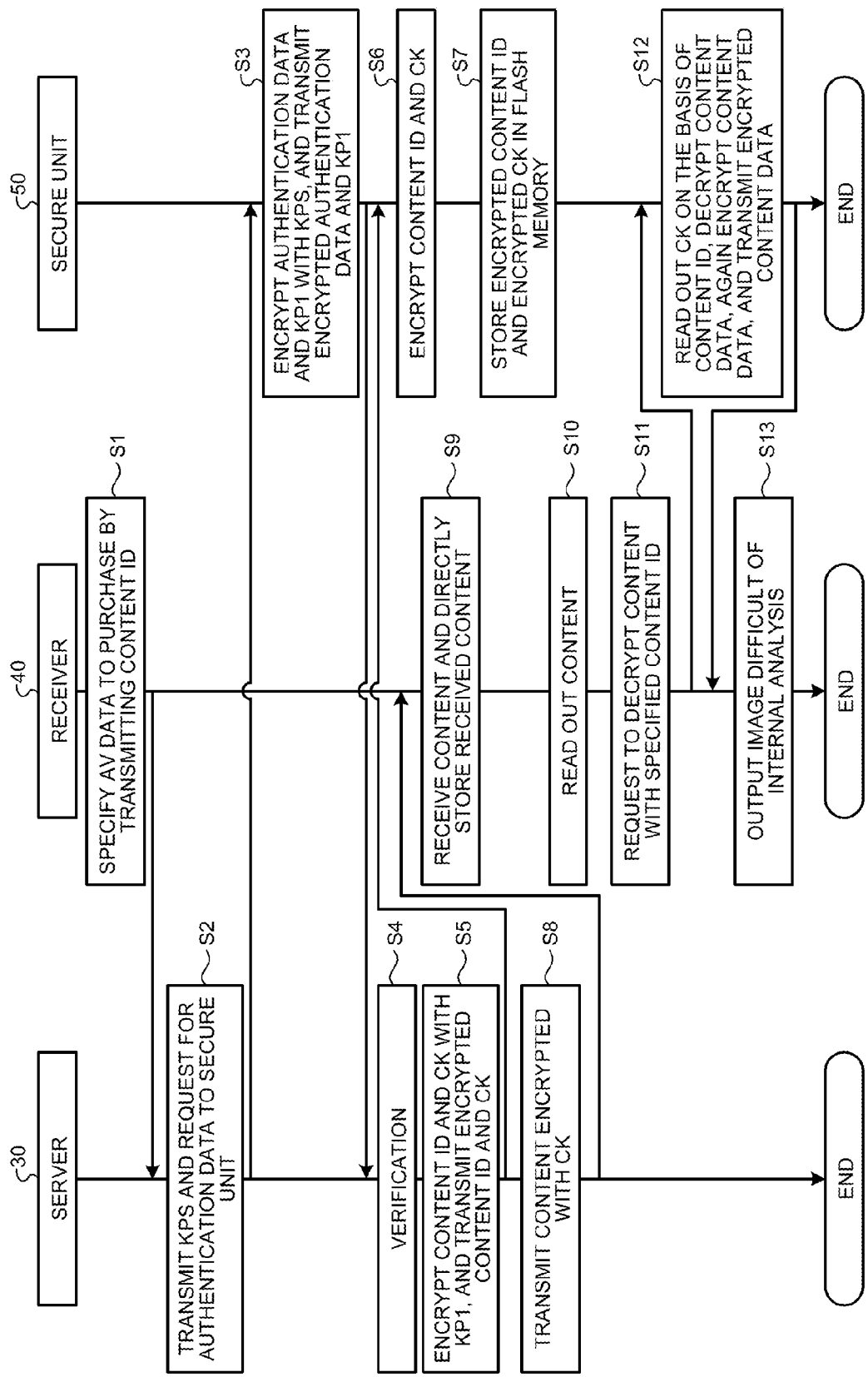

FIG.7

| OFFSET | DATA |
|---|---|
| 0 | 67 12 03 14 FE 19 13 32    7E 19 0A 13 47 11 04 9A    09 98 34 74 13 45 01 13    ED 8A 19 63 13 01 4C 7B |
| 20 | 78 13 42 A3 9C 32 57 BA    19 14 78 A3 A4 B1 94 14    13 94 27 60 13 87 13 41    B4 92 C4 0A 42 14 05 89 |
| 40 | 1C EA 10 2C F8 C0 C4 30    EB 09 1A D1 C0 E2 F8 05    12 C1 D9 11 02 A0 98 99    25 C1 8C 93 43 12 47 10 |
| 60 | 12 C1 D9 11 02 A0 98 99    25 C1 8C 93 43 12 47 10    12 C1 D9 11 02 A0 98 99    25 C1 8C 93 43 12 47 10 |
| 80 | 1C EA 10 2C F8 C0 C4 30    EB 09 1A D1 C0 E2 F8 05    12 C1 D9 11 02 A0 98 99    25 C1 8C 93 43 12 47 10 |
| A0 | 12 C1 D9 11 02 A0 98 99    25 C1 8C 93 43 12 47 10    12 C1 D9 11 02 A0 98 99    25 C1 8C 93 43 12 47 10 |

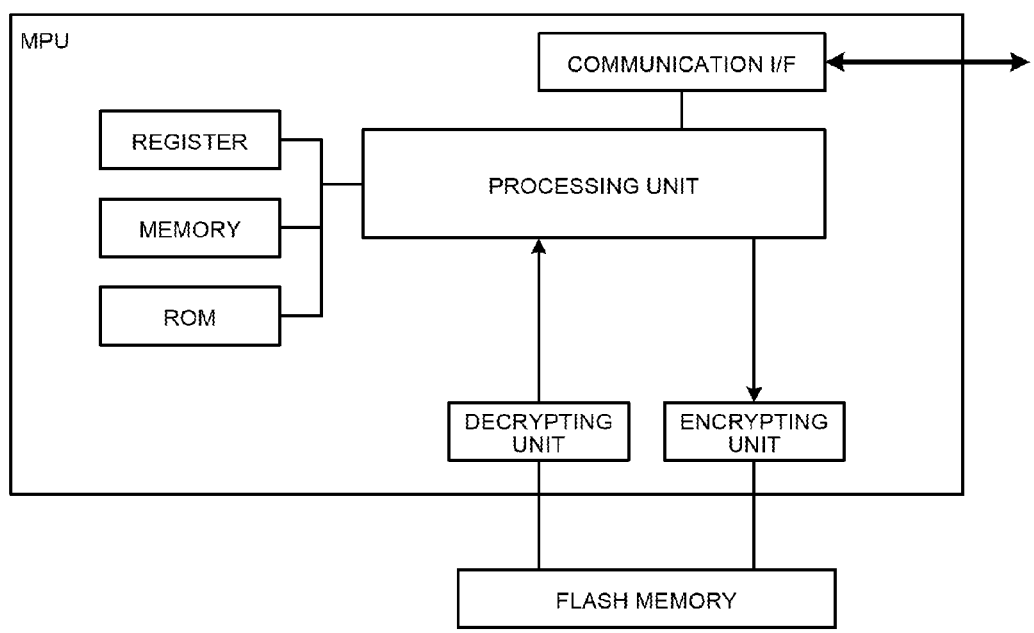

INFORMATION PROCESSING APPARATUS, INFORMATION PROCESSING METHOD, AND COMPUTER READABLE STORAGE MEDIUM

CROSS-REFERENCE TO RELATED APPLICATION

This application is a continuation of International Application No. PCT/JP2011/052782, filed on Feb. 9, 2011, the entire contents of which are incorporated herein by reference.

FIELD

The embodiments discussed herein are related to an information processing apparatus, information processing method, and computer readable storage medium. Particularly, the embodiments discussed herein are directed to a small-scale management unit that manages secret data and includes an MPU and a flash memory. Furthermore, the embodiments discussed herein are directed to an MPU with a built-in encryption system.

BACKGROUND

Conventionally, there are known technologies of encrypting information to be kept secret when the information is stored in a non-volatile memory, such as a flash memory, and storing the encrypted information, thereby making malicious analysis of the information stored in the non-volatile memory difficult. As an example of such technologies, a management unit for AV (Audio Video) data, such as a moving image, protected by copyright is known; the management unit encrypts management information, such as a cipher key and the copyable number of times, and stores the encrypted management information in a non-volatile memory.

FIG. 10 is a diagram for explaining an conventional MPU that stores encrypted management information in a non-volatile memory. In an example illustrated in FIG. 10, the MPU in a management unit includes an encrypting unit and a decrypting unit. The encrypting unit encrypts information with a cipher key unique to the management unit. The decrypting unit decrypts the encrypted information. Incidentally, the encrypting unit and the decrypting unit are composed of a logic circuit or a program, and embedded in the MPU. The MPU is connected to a flash memory in which management information is stored.

When the MPU stores management information in the flash memory, the MPU causes the encrypting unit to encrypt the management information and stores the encrypted management information in the flash memory. Furthermore, the MPU causes the decrypting unit to decrypt management information stored in the flash memory. The MPU acquires a cipher key (a decryption key) from the decrypted management information, and decrypts separately-acquired encrypted AV data with this key. After that, the MPU transmits the decrypted AV data to a main body, such as a personal computer (PC) or a set-top box (STB), via a communication interface (I/F).

[Patent document 1] Japanese Laid-open Patent Publication No. 2000-341632
[Patent document 2] Japanese Laid-open Patent Publication No. 07-225551

However, in the above-described technology of storing encrypted management information in a non-volatile memory such as a flash memory, the encrypted management information is directly stored in the non-volatile memory. Therefore, if pre-encryption management information can be easily estimated, an attacker can acquire a cipher key by making an exhaustive attack using the pre- and post-encryption management information. As a result, there is a problem of not satisfying tamper resistance.

FIG. 11 is a diagram for explaining an example of management information of AV data. In the example illustrated in FIG. 11, the management information includes multiple storage areas; 2 bytes of management number, 4 bytes of management ID, 2 bytes of permission flag, 1 byte of the number of copyings, 3 bytes of expiration date, 36 bytes of name, and 16 bytes of cipher key are stored in the respective storage areas. A cipher key stored in management information here is a decryption (cipher) key for decrypting AV data to be managed.

For example, when data of a non-volatile memory is initialized, an MPU generates an initial value that "0" is stored in each storage area of management information. Then, the MPU encrypts the generated initial data, and directly stores the encrypted initial data in the non-volatile memory. Therefore, when an attacker, who is trying to analyze the management information stored in the non-volatile memory, has initialized and analyzed data of the non-volatile memory, the attacker can acquire an encrypted value of the initial value that "0" has been stored in all the storage areas.

Here, the attacker can easily estimate that management information that "0" has been stored in storage areas thereof is generated as an initial value at the time of initialization of data of the non-volatile memory. Therefore, using the estimated initial value and the encrypted value of the initial value, the attacker can make an exhaustive attack for analyzing a cipher key. Namely, when an encrypted value of easy-to-estimate management information, such as an initial value, has been stored in the non-volatile memory, the attacker can easily analyze a cipher key for encrypting the management information.

In this manner, when the MPU directly stores encrypted management information in the non-volatile memory, it is easy to analyze a cipher key for encrypting the management information, and therefore tamper resistance becomes worse. As a result, the cipher key for encrypting the management information is easily analyzed, and the tamper resistance is worsened.

SUMMARY

According to an aspect of an embodiment, an information processing apparatus includes an encrypting unit that encrypts a value to be kept secret with a predetermined cipher key. The information processing apparatus includes a converting unit that converts, when the value to be kept secret is an initial value written at the time of initialization of a storage device in which a value encrypted by the encrypting unit is stored, the value encrypted by the encrypting unit into a value which is reversibly convertible and is independent of the cipher key used by the encrypting unit. The information processing apparatus includes a storing unit that stores the value converted by the converting unit in the storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram for explaining an example of data stored in a flash memory according to the first embodiment;

FIG. 3 is a diagram for explaining initial data stored in a conventional flash memory;

FIG. 4 is a diagram for explaining a unit of management information manipulated by a conventional MPU;

FIG. 5 is a diagram for explaining an example of data stored in the conventional flash memory;

FIG. 6 is a sequence diagram for explaining an example of a secure unit;

FIG. 7 is a diagram for explaining an example of management information stored in the flash memory by the conventional secure unit;

FIG. 10 is a diagram for explaining a conventional MPU that stores encrypted management information in a non-volatile memory; and FIG. 11 is a diagram for explaining an example of management information of AV data.

DESCRIPTION OF EMBODIMENTS

Preferred embodiments of the present invention will be explained with reference to accompanying drawings.

[a] First Embodiment

Figure 1:
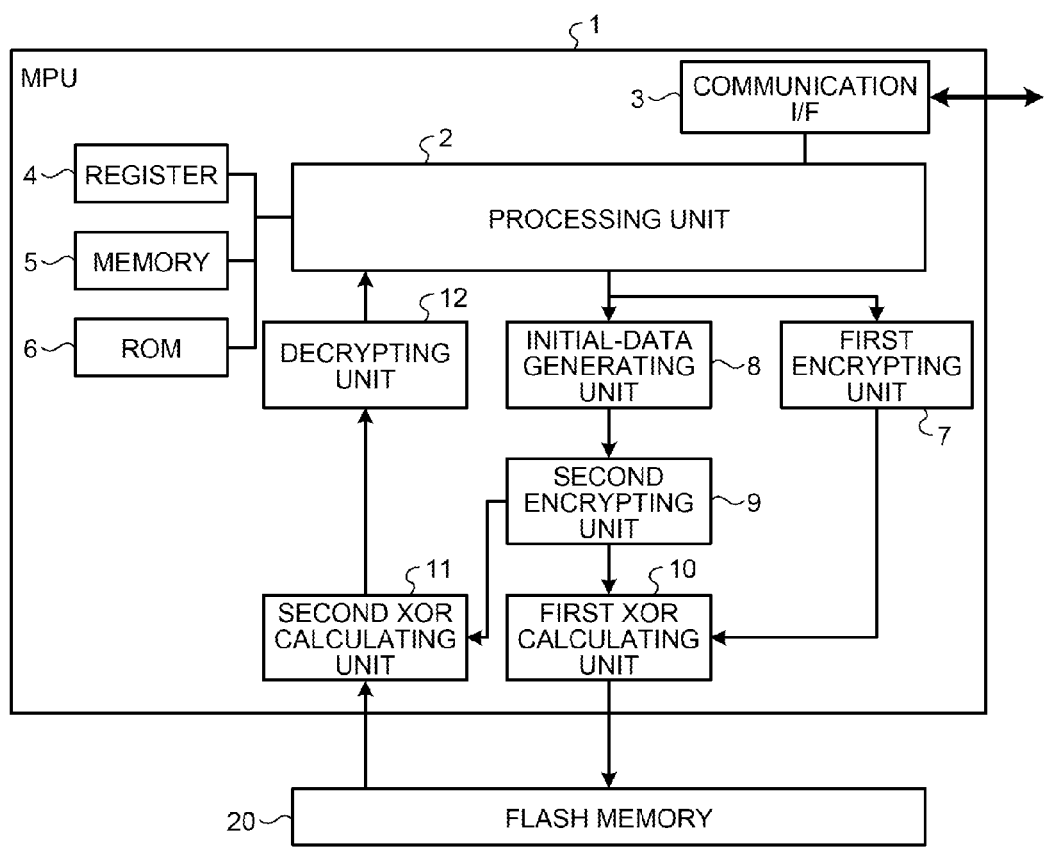
FIG. 1 is a diagram for explaining an MPU according to a first embodiment.

In a first embodiment described below, an example of an MPU that manages management information of AV data, such as a moving image, protected by copyright is explained with reference to FIG. 1. FIG. 1 is a diagram for explaining the MPU according to the first embodiment. Incidentally, an MPU 1 is assumed to be, for example, an MPU installed in a secure unit or small embedded unit, etc. that decrypts encrypted AV data.

Furthermore, management information stored in a flash memory is assumed to include information on a cipher key for encrypting and decrypting AV data, a name of the AV data, and the permitted number of times the AV data can be copied, etc. For example, management information includes a management number of AV data, management ID of the AV data, a copy permission flag, the permitted number of times the AV data can be copied, an expiration date, a name of the AV data, and a cipher key for decrypting the AV data, etc. as records.

As illustrated in FIG. 1, the MPU 1 includes a central processing unit (CPU) processing unit 2, a communication interface (I/F) 3, a register 4, a memory 5, and a read-only memory (ROM) 6. The MPU 1 further includes a first encrypting unit 7, an initial-data generating unit 8, a second encrypting unit 9, a first XOR calculating unit 10, a second XOR calculating unit 11, and a decrypting unit 12. Furthermore, the MPU 1 is connected to an external flash memory 20.

The communication I/F 3 is an interface that performs transmission and reception of AV data with a personal computer (PC) or set-top box (STB) that plays back the AV data, and a Peripheral Component Interconnect (PCI) bus or a universal serial bus (USB), etc. is applied. Furthermore, the communication I/F 3 uses public key cryptography to communicate with a server, which manages management information of AV data, and receive the management information of the AV data.

The register 4 is a temporary storage device used by the processing unit 2. The memory 5 is a memory used by the processing unit 2. The ROM 6 stores therein a program for a process performed by the processing unit 2.

The processing unit 2 manages management information of AV data. Specifically, when the processing unit 2 has acquired management information, such as a cipher key for decrypting AV data, via the communication I/F 3, the processing unit 2 transmits the acquired management information to the first encrypting unit 7. And, the processing unit 2 further transmits a memory address of the flash memory 20 in which the acquired management information is stored to the first encrypting unit 7. And then, the processing unit 2 transmits a trigger signal to generate initial data to the initial-data generating unit 8.

Furthermore, when the processing unit 2 has received content ID and encrypted content from an STB or the like via the communication I/F 3, the processing unit 2 transmits a request for acquisition of management information and a memory address in which the management information indicated by the received content ID has been stored to the decrypting unit 12. Then, the processing unit 2 transmits a trigger signal to generate initial data to the initial-data generating unit 8. After that, when the processing unit 2 has received decrypted management information via the second XOR calculating unit 11 and the decrypting unit 12, the processing unit 2 decrypts the received content by using the received management information. Then, the processing unit 2 transmits the decrypted content to a PC or STB via the communication I/F 3.

Moreover, when the processing unit 2 has been notified of management information to be initialized via the communication I/F 3, the processing unit 2 generates initial data which is an initial value of the management information. And, the processing unit 2 determines a memory address of the flash memory 20 in which the management information indicated by the notified information has been stored. Then, the processing unit 2 transmits the generated initial data and the determined memory address to the first encrypting unit 7. And then, the processing unit 2 transmits a trigger signal to generate initial data to the initial-data generating unit 8.

For example, the processing unit 2 determines "0x00", "0x08", and "0x10" as memory addresses in which management information to be initialized has been stored. And, the processing unit 2 generates hexadecimal data "E0, 00, 00, 00, 00, 00, 00, 00" as initial data to be stored in the memory address "0x00" of the flash memory 20.

Then, the processing unit 2 generates hexadecimal data "00, 00, 00, 00, 00, 00, 00, 00" as initial data to be stored in the memory addresses "0x08" and "0x10" of the flash memory 20. And then, the processing unit 2 transmits the determined memory addresses and the respective initial data to be stored in the memory addresses to the first encrypting unit 7.

The first encrypting unit 7 encrypts information to be kept secret with a predetermined cipher key. Specifically, the first encrypting unit 7 acquires management information of AV data and a memory address of the flash memory 20 from the processing unit 2. Then, the first encrypting unit 7 encrypts the acquired management information of the AV data with the predetermined cipher key. After that, the first encrypting unit 7 transmits the encrypted management information and the acquired memory address to the first XOR calculating unit 10.

Likewise, when the first encrypting unit 7 has received initial data from the processing unit 2, the first encrypting unit 7 encrypts the received initial data with the predetermined cipher key. Then, the first encrypting unit 7 transmits the encrypted initial data to the first XOR calculating unit 10.

To the cipher key used by the first encrypting unit 7 here, an arbitrary method and arbitrary length of a cipher key is applied. In the description below, the first encrypting unit 7 is assumed to use a cryptographic method using 8 bytes as a block length, such as MULTI2 or CAST-128, to encrypt management information and initial data in electronic code book (ECB) mode. Incidentally, a method and length of a cipher key and a processing mode are not limited to these.

For example, the first encrypting unit 7 acquires "E0, 00, 00, 00, 00, 00, 00, 00" as initial data to be stored in the memory address "0x00" from the processing unit 2. In this case, the first encrypting unit 7 calculates encrypted data "1201, 04AF, 98A3, 31B3" by encrypting the acquired initial data "E0, 00, 00, 00, 00, 00, 00, 00" in ECB mode with respect to each 8 bytes.

Furthermore, the first encrypting unit 7 acquires initial data "00, 00, 00, 00, 00, 00, 00, 00" to be stored in the memory addresses "0x08" and "0x10". In this case, the first encrypting unit 7 calculates encrypted data "1934, A41C, 1298, B013" by encrypting the acquired initial data "00, 00, 00, 00, 00, 00, 00, 00".

After that, the first encrypting unit 7 transmits the acquired memory addresses "0x00", "0x08", and "0x10" and the calculated data "1201, 04AF, 98A3, 31B3" and "1934, A41C, 1298, B013" to the first XOR calculating unit 10.

The initial-data generating unit 8 generates initial data and transmits the generated initial data to the second encrypting unit 9. Specifically, when the initial-data generating unit 8 has received a trigger signal to generate initial data from the processing unit 2, the initial-data generating unit 8 generates initial data and transmits the generated initial data to the second encrypting unit 9.

For example, the initial-data generating unit 8 creates hexadecimal data "00, 00, 00, 00, 00, 00, 00, 00" as initial data to be stored in a memory address of the flash memory. Then, the initial-data generating unit 8 transmits the generated initial data and a received memory address to the second encrypting unit 9.

The second encrypting unit 9 encrypts initial data with the same cipher key as that used by the first encrypting unit 7, and transmits the encrypted initial data to the first XOR calculating unit 10 and the second XOR calculating unit 11. Specifically, when the second encrypting unit 9 has received initial data from the initial-data generating unit 8, the second encrypting unit 9 encrypts the received initial data with the same cipher key as that used by the first encrypting unit 7. After that, the second encrypting unit 9 transmits the encrypted initial data to the first XOR calculating unit 10 and the second XOR calculating unit 11.

For example, the second encrypting unit 9 receives "00, 00, 00, 00, 00, 00, 00, 00" as initial data from the initial-data generating unit 8. In this case, the second encrypting unit 9 encrypts the received initial data with the same cipher key as that used by the first encrypting unit 7.

Namely, the second encrypting unit 9 calculates encrypted data "1934, A41C, 1298, B013" by encrypting the acquired initial data "00, 00, 00, 00, 00, 00, 00, 00". After that, the second encrypting unit 9 transmits the calculated data "1934, A41C, 1298, B013" to the first XOR calculating unit 10 and the second XOR calculating unit 11.

The first XOR calculating unit 10 processes information encrypted by the first encrypting unit 7 to convert the encrypted information into information which is independent of the cipher key used by the first encrypting unit 7 and is reversibly convertible from the information independent of the cipher key into the information encrypted by the first encrypting unit 7. Then, the first XOR calculating unit 10 stores the converted information in the flash memory 20.

Specifically, the first XOR calculating unit 10 acquires encrypted management information and a memory address in which the management information is to be stored from the first encrypting unit 7. Furthermore, the first XOR calculating unit 10 acquires encrypted initial data from the second encrypting unit 9. Then, the first XOR calculating unit 10 calculates XORed information by XORing the encrypted management information and the encrypted initial data. After that, the first XOR calculating unit 10 stores the calculated value in the acquired memory address out of storage areas that the flash memory 20 has.

FIG. 2 is a diagram for explaining an example of data stored in the flash memory according to the first embodiment. For example, in the example illustrated in FIG. 2, the first XOR calculating unit 10 receives "1201, 04AF, 98A3, 31B3", which is a result of encryption of management information to be stored in the memory address "0x00", as a result of encryption by the first encrypting unit 7. Furthermore, the first XOR calculating unit 10 receives "1934, A41C, 1298, B013", which is a result of encryption of management information to be stored in the memory addresses "0x08" and "0x10", as a result of encryption by the first encrypting unit 7.

Moreover, the first XOR calculating unit 10 receives encrypted initial data "1934, A41C, 1298, B013" from the second encrypting unit 9. Then, the first XOR calculating unit 10 calculates bitwise-XORed information by bitwise XORing the respective pieces of management information encrypted by the first encrypting unit 7, which are to be stored in the memory addresses, and the initial data encrypted by the second encrypting unit 9.

As a result, the first XOR calculating unit 10 calculates "0B35, A0B3, 8A3B, 81A0" as memory data to be stored in the memory address "0x00". Then, the first XOR calculating unit 10 stores the calculated data "0B35, A0B3, 8A3B, 81A0" in the memory address "0x00" of the flash memory 20.

Furthermore, the first XOR calculating unit 10 calculates "0000, 0000, 0000, 0000" as memory data to be stored in the memory addresses "0x08" and "0x10". Then, the first XOR calculating unit 10 stores the calculated data "0000, 0000, 0000, 0000" in the memory addresses "0x08" and "0x10" of the flash memory 20.

In this manner, when the MPU 1 initializes management information, the first XOR calculating unit 10 acquires a value of initial data encrypted by the first encrypting unit 7 with a predetermined cipher key. Furthermore, the first XOR calculating unit 10 acquires a value of initial data encrypted by the second encrypting unit 9 with the same cipher key as that used by the first encrypting unit 7. Then, the first XOR calculating unit 10 calculates XORed information by XORing the respective pieces of information acquired from the first encrypting unit 7 and the second encrypting unit 9, and stores the calculated value in the flash memory 20.

As a result, when having XORed the pieces of information acquired from the first encrypting unit 7 and the second encrypting unit 9, the first XOR calculating unit 10 calculates information which has the same number of bits as the management information and values of the bits are all "0". Namely, by calculating exclusive OR of the pieces of initial data encrypted with the same cipher key, the first XOR calculating unit 10 calculates information independent of the cipher key. Therefore, the first XOR calculating unit 10 stores not the encrypted value of the initial data but the information which has the same number of bits as the management information and values of the bits are all "0" in the memory addresses to be initialized in the flash memory 20.

In this case, when an attacker has analyzed the flash memory 20, the attacker does not acquire the encrypted initial data unlike the conventional technology. Therefore, even when pre-encryption initial data can be easily estimated, the attacker does not acquire the encrypted initial data, and therefore it is difficult to analyze the cipher key for encrypting the management information by an exhaustive attack.

Furthermore, it is difficult to estimate pre-encryption information of part other than the initial data. Therefore, the attacker is assumed to be unable to analyze the cipher key by an exhaustive attack using encrypted information of the part other than the initial data. Consequently, the MPU 1 can make it difficult to analyze management information stored in the flash memory 20, and can enhance tamper resistance.

On the other hand, an MPU implementing the conventional technology (hereinafter, referred to as a "conventional MPU") directly stores an encrypted value in a flash memory. Therefore, the conventional MPU does not prevent an attacker from acquiring the encrypted value from the external flash memory unless it is physically configured to be strictly tamper-free.

Details of such a conventional MPU are explained below. For example, FIG. 3 is a diagram for explaining initial data stored in a conventional flash memory. In an example illustrated in FIG. 3, as initial data, information indicating "all_0" is stored in all storage areas. The conventional MPU stores an encrypted value of "all_0" included in management information in the flash memory in order to keep the management information completely secret.

In the above-described explanation, there is described the example where the conventional MPU uses the ECB mode for the sake of convenience; however, in cryptography, using not the ECB but cipher block chaining (CBC) mode or the like is known as a method to enhance the cipher strength of typical data, especially, like initial data. This is to make an encryption result of a certain block dependent on data of the immediately preceding block or an encryption result of the immediately preceding block.

FIG. 4 is a diagram for explaining a unit of management information manipulated by the conventional MPU. In an example illustrated in FIG. 4, when the CBC mode is applied, a cipher of management information 2 depends on management information 1 which is the immediately preceding data.

Practically, management information may be updated with the playback or copying of AV data, like, for example, when the permitted copyable number is reduced. For example, when AV data corresponding to the management information 1 is copied, the permitted copyable number is reduced by one. In this case, the management information 1 will be updated, and as a result, the management information 2 and therefore management information 3 will be encrypted again. This is undesirable implementation.

Accordingly, there is a method to use a different cipher key for management information with respect to each management number. For example, a cipher key that an MPU has is combined with a memory address in which management information is written. In the example illustrated in FIG. 4, there is provided an example where an individual cipher key is used with respect to each management number. In this method, a result of encryption of initial data like "all_0" differs according to management number.

However, as for a specific management number or memory address, a specific cipher key is used in the same manner. When an attack is made with a focus on a specific management number, initial data ("all_0" or the like) corresponding to the management number and a result of encryption of the initial data with a cipher key corresponding to the management number are obtained; therefore, using these, an attacker can make an exhaustive attack for estimating the cipher key corresponding to the management number.

In this manner, the conventional MPU encrypts management information and stores the encrypted management information in the flash memory; however, it is not possible to prevent an attacker from acquiring the encrypted value from the external flash memory unless it is physically configured to be strictly tamper-free. Consequently, when an easy-to-estimate value is encrypted and stored in the flash memory, an attacker can acquire pre- and post-encryption values of the easy-to-estimate value, and can easily make an exhaustive attack.

For example, as illustrated in FIG. 5, the conventional MPU stores an encrypted value "1201, 04AF, 98A3, 31B3", which is a result of encryption of initial data "E5, 00, 00, 00, 00, 00, 00, 00" provided as data of a value seen from the CPU, in the memory address "0x00". Furthermore, the conventional MPU stores an encrypted value "1934, A41C, 1298, B013", which is a result of encryption of initial data "00, 00, 00, 00, 00, 00, 00, 00" provided as data of a value seen from the CPU, in the memory addresses "0x08" and "0x10". FIG. 5 is a diagram for explaining an example of data stored in the conventional flash memory.

Therefore, by analyzing the flash memory, an attacker can estimate that "1934, A41C, 1298, B013" is an encrypted value of the initial data "00, 00, 00, 00, 00, 00, 00, 00". As a result, using the estimated initial data "00, 00, 00, 00, 00, 00, 00, 00" and the acquired value "1934, A41C, 1298, B013", the attacker can easily make an exhaustive attack for a cipher key. Accordingly, the conventional technology has a problem in tamper resistance.

Furthermore, in the conventional technology, encrypted initial data is directly stored in the flash memory; therefore, even if a cipher key having the long key length or a secure cryptographic method is adopted, when the encrypted initial data has been acquired by an attacker, an exhaustive attack for the cipher key is possible. Namely, there is a problem that the conventional MPU does not prevent an exhaustive attack regardless of cryptographic key method and the like.

On the other hand, the MPU 1 according to the present invention can set initial data stored after having encrypted the initial data to a value independent of a cipher key regardless of cryptographic method and length of the cipher key. Therefore, even if an attacker makes an exhaustive attack, it is difficult for the attacker to estimate the cipher key. Consequently, it is possible to enhance tamper resistance.

To return to FIG. 1, the second XOR calculating unit 11 calculates XORed information by XORing a value encrypted with the same cipher key as that used by the first encrypting unit 7 and information stored in the flash memory 20 by the first XOR calculating unit 10. Then, the second XOR calculating unit 11 transmits the calculated value to the decrypting unit 12.

Specifically, when the second XOR calculating unit 11 has acquired a memory address of the flash memory 20 from the decrypting unit 12, the second XOR calculating unit 11 acquires information stored in the acquired memory address out of pieces of information stored in the flash memory 20. Namely, the second XOR calculating unit 11 acquires XORed information of management information encrypted by the first encrypting unit 7 and initial data encrypted by the second encrypting unit 9.

Furthermore, the second XOR calculating unit 11 acquires initial data encrypted by the second encrypting unit 9 with the same cipher key as that used by the first encrypting unit 7. Then, the second XOR calculating unit 11 calculates XORed information by XORing the information acquired from the flash memory 20 and the information acquired from the second encrypting unit 9.

Namely, the second XOR calculating unit 11 calculates XORed information by XORing the exclusive OR of the encrypted management information and the encrypted initial data and the further-encrypted initial data. As a result, the second XOR calculating unit 11 calculates the management information encrypted by the first encrypting unit 7. After that, the second XOR calculating unit 11 transmits the calculated value, i.e., the same information as the management information encrypted by the first encrypting unit 7 to the decrypting unit 12.

The decrypting unit 12 decrypts information calculated by the second XOR calculating unit 11 with the same cipher key as that used by the first encrypting unit 7. Specifically, when the decrypting unit 12 has received a memory address of the flash memory 20 from the processing unit 2, the decrypting unit 12 notifies the second XOR calculating unit 11 of the received memory address. Then, the decrypting unit 12 receives XORed information of information stored in the notified memory address and initial data encrypted by the second encrypting unit 9 from the second XOR calculating unit 11.

Namely, the decrypting unit 12 acquires management information encrypted by the first encrypting unit 7 from the second XOR calculating unit 11. Then, the decrypting unit 12 decrypts the encrypted management information with the cipher key used by the first encrypting unit 7.

For example, when the decrypting unit 12 has decrypted information "1201, 04AF, 98A3, 31B3" calculated by the second XOR calculating unit 11, the decrypting unit 12 obtains "E5, 00, 00, 00, 00, 00, 00, 00". Then, the decrypting unit 12 transmits the obtained value "E5, 00, 00, 00, 00, 00, 00, 00" to the processing unit 2.

Furthermore, when the decrypting unit 12 has decrypted information "1934, A41C, 1298, B013" calculated by the second XOR calculating unit 11, the decrypting unit 12 obtains "00, 00, 00, 00, 00, 00, 00, 00". Then, the decrypting unit 12 transmits the obtained value "00, 00, 00, 00, 00, 00, 00, 00" to the processing unit 2.

In this manner, when management information stored in the flash memory 20 is acquired, the second XOR calculating unit 11 calculates XORed information of information stored in the flash memory 20 and an encrypted value of initial data. Then, the decrypting unit 12 decrypts the information calculated by the second XOR calculating unit 11. Therefore, the MPU 1 can accurately decrypt information stored in the flash memory 20.

Furthermore, the MPU 1 includes the units 7 to 12 on a circuit connecting the processing unit 2 and the flash memory 20. Therefore, the MPU 1 can properly operate without having to cause the processing unit 2 to execute a program taking into consideration that encrypted information has been stored in the flash memory 20.

For example, the communication I/F 3, the processing unit 2, the first encrypting unit 7, the initial-data generating unit 8, the second encrypting unit 9, the first XOR calculating unit 10, the second XOR calculating unit 11, and the decrypting unit 12 are electronic circuits. As an example of the electronic circuits, integrated circuits, such as an application specific integrated circuit (ASIC) and a Field Programmable Gate Array (FPGA), or a CPU and a micro processing unit (MPU), etc. are applied. Furthermore, logic circuits, such as a programmable logic array (PLA) and a gate array, can also be applied to the units 7 to 12.

In this manner, when the MPU 1 stores encrypted information in the flash memory 20, the MPU 1 calculates exclusive OR of the encrypted information and initial data encrypted with the same cipher key as that used in the encryption of the information, and stores the calculated exclusive OR in the flash memory 20. Therefore, when the MPU 1 stores the initial data in the flash memory 20, the MPU 1 stores information with all bits set to "0" in the flash memory 20; therefore, an encryption result corresponding to the initial data can be kept secret from an attacker. Consequently, this method can prevent an attacker from calculating the cipher key for encrypting the information by an exhaustive attack, and can improve a high rate of tampering.

Subsequently, an example of application of the MPU 1 to a secure unit that receives a cipher key for decrypting AV data from a server, which encrypts AV data protected by copyright and delivers the encrypted AV data, and manages the received cipher key is explained with reference to drawings.

FIG. 6 is a sequence diagram for explaining an example of the secure unit. In an example illustrated in FIG. 6, a server 30 has a private key KHS and public key KPS based on public key cryptography. A secure unit 50 has a unit-specific private key KH1 and public key KP1. Furthermore, in the example illustrated in FIG. 6, the secure unit 50 is assumed to include the MPU 1 and use the MPU 1 to store an encrypted value in a flash memory.

In the example illustrated in FIG. 6, a receiver 40, which receives AV data from the server 30, specifies AV data to purchase by transmitting content ID (Step S1). Then, the server 30 performs authentication of a user and a billing process, and transmits the public key KPS and a request for authentication data held by the secure unit 50 to the secure unit 50 (Step S2).

Then, the secure unit 50 encrypts the KP1 and authentication data with the KPS, and transmits the encrypted KP1 and authentication data to the server 30 (Step S3). The server 30 decrypts the encrypted authentication data, and verifies the authentication data (Step S4). Then, the server 30 generates a cipher key CK for content, and encrypts the content ID of requested content and the generated CK with the KP1, and then transmits the encrypted content ID and CK to the secure unit 50 (Step S5).

When having acquired the content ID and the CK, the secure unit 50 causes the MPU 1 to encrypt the acquired content ID and CK (Step S6). Then, the secure unit 50 causes the MPU 1 to store management information including the content ID and CK encrypted with a cipher key unique to the secure unit 50 in the flash memory (Step S7). Here, it is assumed to be known that AES (128 bits) is used as a cryptographic method of management information.

Furthermore, the server 30 transmits content encrypted with the CK to the receiver 40 (Step S8). Then, the receiver 40 stores the received content in an hard disk drive (HDD) or the like included in the receiver 40 (Step S9). Incidentally, the content received by the receiver 40 has been encrypted with the CK transmitted to the secure unit 50, and the CK exists only in the secure unit 50; therefore, the content is not decrypted without the secure unit 50.

When the receiver 40 plays back the received content, the receiver 40 reads out the content encrypted with the CK (Step S10), and requests the secure unit 50 to decrypt the encrypted content with the specified content ID (Step S11). Then, using the content ID as a clue, the secure unit 50 reads out the CK stored in the flash memory and decrypts the read CK, and decrypts the encrypted content with the CK.

Furthermore, the secure unit 50 generates a random number EK, and encrypts the content with the generated EK, and then transmits the encrypted content and the EK encrypted with a public key KPD that an AV output unit of the receiver 40 has to the receiver 40 (Step S12). After that, the AV output unit of the receiver 40 decrypts the EK with a private key KHD, and decrypts the received content with the generated EK, and then outputs an image of the decrypted content while making internal analysis difficult (Step S13).

In such a system, when an attacker tries to make a copy of content or fraudulently use content, the attacker tries to analyze information stored in the flash memory by the secure unit 50 and break the CK. For example, when the secure unit 50 has stored only one CK with which content was encrypted by not the MPU 1 but the conventional MPU, data illustrated in FIG. 7 is stored in the flash memory. Incidentally, FIG. 7 is a diagram for explaining an example of management information stored in the flash memory by a conventional secure unit.

In data illustrated in FIG. 7, information "12, C1, D9, 11, 02, A0, 98, 99, 25, C1, 8C, 93, 43, 12, 47, 10" is repeated. Therefore, an attacker can easily assume that this repeated information is what "all 0" frequently used as initial data was encrypted with a 16-byte cipher key.

So, the attacker is assumed to be able to acquire a CK stored in the flash memory by just searching for a cipher key for calculating the repeated data at the time of encryption of "all 0" by 128-bit AES. Furthermore, the attacker is assumed to be able to easily calculate the cipher key by using a dictionary of "all 0" encrypted with various cipher keys.

On the other hand, in the system illustrated in FIG. 6, when the MPU 1 according to the first embodiment is applied to the secure unit 50, information independent of the cipher key, i.e., "0" is stored in the repeated information in FIG. 7, i.e., part of the encrypted value of the initial data. Therefore, even if it is easy to estimate the initial data, an attacker does not acquire the encrypted initial data, and does not calculate the cipher key with which the CK was encrypted by an exhaustive attack. As a result, the MPU 1 can enhance tamper resistance.

Effects of First Embodiment

As described above, the MPU 1 encrypts management information with a predetermined cipher key. Then, when a value to be kept secret is initial data written at the time of initialization of the flash memory 20, the MPU 1 converts the encrypted management information into information which is reversibly convertible and is independent of the cipher key. After that, the MPU 1 stores the converted information in the flash memory 20. Namely, the MPU 1 stores the information which does not have a one-to-one correspondence to the cipher key used in the encryption of the management information in the flash memory 20.

Therefore, the MPU 1 can keep initial data of the encrypted management information secret from an attacker. As a result, the MPU 1 can make it virtually impossible for the attacker to analyze the cipher key by an exhaustive attack, and can enhance tamper resistance at a small cost.

Furthermore, the MPU 1 stores XORed information of management information encrypted by the first encrypting unit 7 with a predetermined cipher key and predetermined information encrypted by the second encrypting unit 9 with the same cipher key as that used by the first encrypting unit 7 in the flash memory 20. Therefore, the MPU 1 can easily keep the encrypted management information secret.

Namely, as a method to keep encrypted management information secret, for example, the first encrypting unit 7 can perform a process of monitoring an encrypted value of management information, detecting an encrypted value of easy-to-estimate management information, and replacing bit values of the detected information into "0" or predetermined information. However, monitoring all encrypted values of management information by the first encrypting unit 7 increases a calculation cost.

On the other hand, the MPU 1 can easily keep initial data of encrypted management information secret by just XORing the encrypted management information and encrypted initial data. As a result, the MPU 1 can easily keep the encrypted management information secret without causing the first encrypting unit 7 to monitor an encrypted value.

In this manner, when initial data of management information is stored in the flash memory 20, the MPU 1 can keep an encrypted value of the initial data secret from an attacker. As a result, the MPU 1 can make it difficult for the attacker to analyze a cipher key on the basis of the encrypted initial data and estimated initial data, and can enhance tamper resistance.

Furthermore, when initial data is stored in the flash memory 20, the MPU 1 typically stores "0" in all bits of a corresponding storage area of the flash memory 20. In the conventional technology, an encryption result of "0" is written in the flash memory; however, this depends on a cipher key. According to the embodiments, it is enough to write "0" without dependence on the cipher key; therefore, "0" can be written in the flash memory 20 alone in advance. Consequently, at the time of manufacture of a product equipped with the MPU 1, a process of clearing the flash memory 20 can be skipped.

Namely, in a case of a product equipped with the conventional MPU, a process of writing an encrypted value of initial data in a flash memory is performed at the time of manufacture. However, a cipher key used by an MPU differs among products equipped with the conventional MPUs; therefore, it is not possible to store the same value in flash memories. Consequently, at the time of manufacture, flash memories of all products have to be initialized, and this increases manufacturing cost.

However, in a case of a product equipped with the MPU 1, even when a cipher key used by an MPU differs from one product to another, it is enough to set "0" in all bits of the flash memory 20. Consequently, the need for the initialization is eliminated by the application of a flash memory with all bits set to "0" to all products, and therefore manufacturing cost can be reduced.

Furthermore, the MPU 1 calculates XORed information of information encrypted by the second encrypting unit 9 and information stored in the flash memory 20. Then, the MPU 1 decrypts the calculated value with the same cipher key as that used by the first encrypting unit 7. Therefore, the MPU 1 can properly read out the information kept secret from an attacker.

[b] Second Embodiment

The embodiment of the present invention is described above; however, the present invention can be embodied in various different forms other than the above-described embodiment. Other embodiments included in the present invention are explained as a second embodiment below.

(1) Regarding the Initial-Data Generating Unit 8 and the Second Encrypting Unit 9

The initial-data generating unit 8 of the above-described MPU 1 generates all-zero data as initial data. However, the embodiment is not limited to this, and the initial-data generating unit 8 can generate initial data containing another value.

Furthermore, the MPU 1 includes the second encrypting unit 9 that encrypts initial data with the same cipher key as that used by the first encrypting unit 7. However, the embodiment is not limited to this; for example, instead of the initial-data generating unit 8 and the second encrypting unit 9, the MPU 1 can include a register in which a value of initial data encrypted with the same cipher key as that used by the first encrypting unit 7 is stored. An MPU 1a including such a register is explained below.

Figure 8:
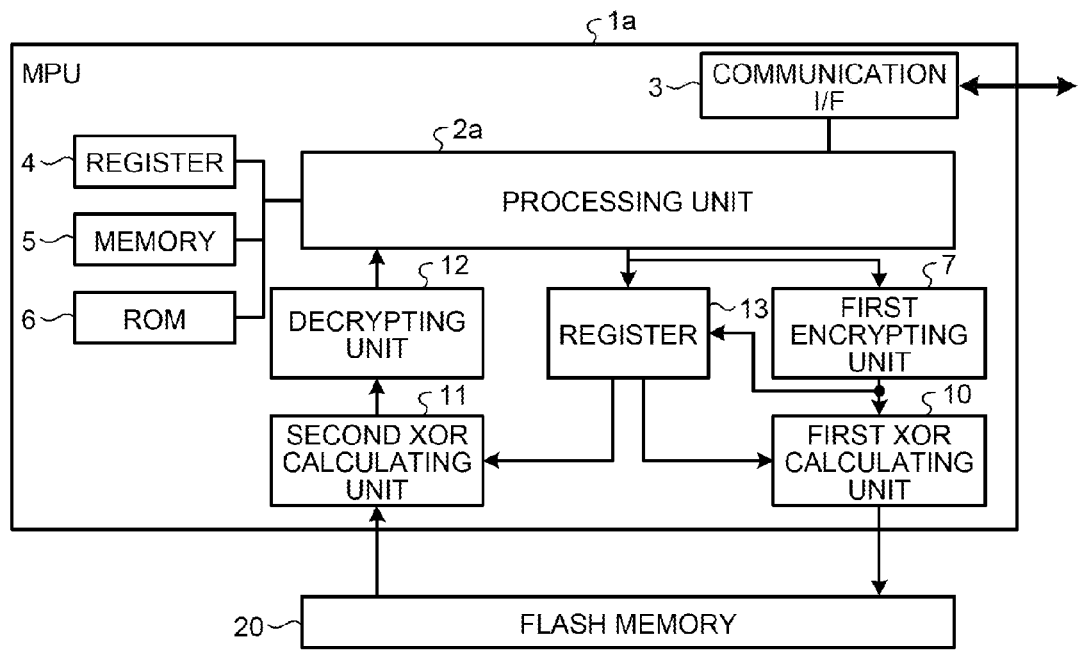
FIG. 8 is a diagram for explaining an MPU according to a second embodiment.

FIG. 8 is a diagram for explaining an MPU according to the second embodiment. In an example illustrated in FIG. 8, the MPU 1a according to the second embodiment includes the communication I/F 3, the register 4, the memory 5, the ROM 6, the first encrypting unit 7, the first XOR calculating unit 10, the second XOR calculating unit 11, and the decrypting unit 12 in common with the MPU 1. The MPU 1a further includes a register 13 instead of the initial-data generating unit 8 and the second encrypting unit 9. Incidentally, the units 3 to 7 and 10 to 12 included in the MPU 1a fulfill the same function as those included in the MPU 1.

A processing unit 2a has the same function as the processing unit 2 according to the first embodiment. When the processing unit 2a has transmitted initial data to the first encrypting unit 7, the processing unit 2a then transmits a trigger signal to latch encrypted initial data to the register 13. Furthermore, instead of a trigger signal to generate initial data, the processing unit 2a transmits a trigger signal to output encrypted initial data to the register 13.

The register 13 is a volatile memory. A value of predetermined information encrypted with the same cipher key as that used by the first encrypting unit 7 has been stored in the register 13 in advance. Specifically, when having received a trigger signal to latch encrypted initial data from the processing unit 2a, the register 13 latches information output from the first encrypting unit 7. In other words, the register 13 latches initial data encrypted by the first encrypting unit 7.

Then, when having received a trigger signal to output encrypted initial data from the processing unit 2a, the register 13 transmits an encrypted value of initial data to the first XOR calculating unit 10 and the second XOR calculating unit 11.

In this manner, the MPU 1a includes the register 13 in which a value of initial data encrypted with the same cipher key as that used by the first encrypting unit 7 has been stored in advance. Then, the MPU 1a stores XORed information of management information encrypted by the first encrypting unit 7 and information stored in the register 13 in the flash memory 20.

Consequently, the MPU 1a can eliminate the need for the initial-data generating unit 8 and the second encrypting unit 9. Therefore, when the MPU 1a is composed of an FPGA, the number of encrypting units can be reduced as compared with the MPU 1. Furthermore, the MPU 1a can reduce the circuit size as compared with the MPU 1.

The MPU 1a stores an encrypted value of initial data in the register 13 which is a volatile memory. Therefore, for example, when the register 13 has been analyzed by an attacker, the encrypted initial data stored in the register 13 is naturally erased, and therefore the MPU 1a can keep the encrypted the initial data secret from the attacker.

(2) Regarding XORed Information

The above-described MPU 1 calculates XORed information of management information encrypted by the first encrypting unit 7 with a predetermined cipher key and initial data encrypted by the second encrypting unit 9 with the same cipher key as that used by the first encrypting unit 7. On the other hand, the MPU 1a calculates XORed information of management information encrypted by the first encrypting unit 7 with a predetermined cipher key and information stored in the register 13, i.e., initial data encrypted by the first encrypting unit 7.

However, the embodiments are not limited to these. Namely, the MPU can use a value of information, which is other than initial data, encrypted with the same cipher key as that used by the first encrypting unit 7 as information XORed with the management information encrypted with the predetermined cipher key.

As an example of such an MPU, there is explained an MPU 1b that stores information corresponding to a memory address in which management information to be initialized has been stored in the flash memory 20 when the MPU 1b initializes the management information. For example, when a processing unit 2b included in the MPU 1b has been notified of information indicating management information to be initialized, the processing unit 2b generates information corresponding to a memory address of the flash memory 20 in which the management information to be initialized has been stored.

Furthermore, the processing unit 2b transmits a trigger signal to generate initial data to an initial-data generating unit 8a, and further transmits the memory address in which the management information to be initialized has been stored to the initial-data generating unit 8a. Namely, the processing unit 2b transmits a trigger signal to generate initial data to the initial-data generating unit 8a, and further transmits a memory address of the flash memory 20 to access to the initial-data generating unit 8a.

When the initial-data generating unit 8a has received the trigger signal to generate initial data and the memory address, the initial-data generating unit 8a generates information corresponding to the received memory address in the same manner as the processing unit 2b. Then, the initial-data generating unit 8a transmits generated initial data to the second encrypting unit 9.

As a result, the MPU 1b encrypts the management information with the predetermined cipher key, and encrypts the information corresponding to the memory address in which the management information has been stored with the same cipher key as that used in the encryption of the management information. Then, the MPU 1b stores XORed information of an encrypted value of the management information and an encrypted value of the information corresponding to the memory address in the flash memory 20. Therefore, even when different initial data is stored in each memory address in which management information has been stored at the time of initialization of management information, the MPU 1b can properly keep encrypted initial data secret from an attacker.

Incidentally, as an example of how the processing unit 2b and the initial-data generating unit 8a generate information corresponding to a memory address, a table memory in which a memory address is associated with 16-word information is installed in the MPU 1b. Then, the processing unit 2b and the initial-data generating unit 8a output 16-word information associated with a memory address to access.

Furthermore, besides initial data, information that an attacker can easily estimate may be included in management information. When an encrypted value of such information is directly stored in the flash memory 20, a cipher key is easily analyzed by an attacker. To solve such a problem, the MPU can XOR an encrypted value of information which is included in management information and is easy-to-estimate with an encrypted value of the management information. An MPU 1c that performs such a process is explained below.

For example, the MPU 1c encrypts management information with a predetermined cipher key, and encrypts information which is part of the management information and is easy-to-estimate with the cipher key used in the encryption of the management information. Then, the MPU 1c stores XORed information of the encrypted management information and the encrypt value of the information which is part of the management information and is easy-to-estimate in the flash memory 20.

Therefore, in the part of which the pre-encryption information can be easily estimated by an attacker out of the encrypted management information stored in the flash memory 20, "0" is stored by the MPU 1c. As a result, the MPU 1c can keep the part of which the pre-encryption information can be easily estimated by an attacker out of the encrypted management information secret from the attacker, and can enhance tamper resistance.

(3) Regarding Cipher Key

The above-described MPU 1 uses a 128-bit wide cipher key based on the AES cryptographic method to encrypt management information and initial data in ECB mode. However, the embodiment is not limited to this; for example, the MPU 1 can encrypt management information and initial data in CBC mode or counter mode. Furthermore, the MPU 1 can perform the encryption using an arbitrary cryptographic method, such as a data encryption standard (DES) cryptographic method or a Triple DES cryptographic method, and an arbitrary key length. Namely, the MPU 1 can perform the encryption using an arbitrary cryptographic method. Incidentally, an encryption device, encryption method, and encryption program discussed in the present application do not deny a method of enhancing cipher, and can be used in conjunction with an arbitrary enhanced cryptographic algorithm.

(4) Regarding Management Information

The above-described MPU 1 encrypts management information of AV data protected by copyright as an example of management information. However, the embodiment is not limited to this, and can be applied to other information. Furthermore, the MPU 1 can be configured to calculate information XORed with a difficult-to-estimate secret value before encrypting management information and XOR an encrypted value of the calculated value and an encrypted value of initial data, thereby making it difficult to estimate the management information other than the initial data. Moreover, the MPU 1 can be connected to and installed in a variety of devices which handle information to be kept secret besides a PC and an STB.

(5) Program

Figure 9:
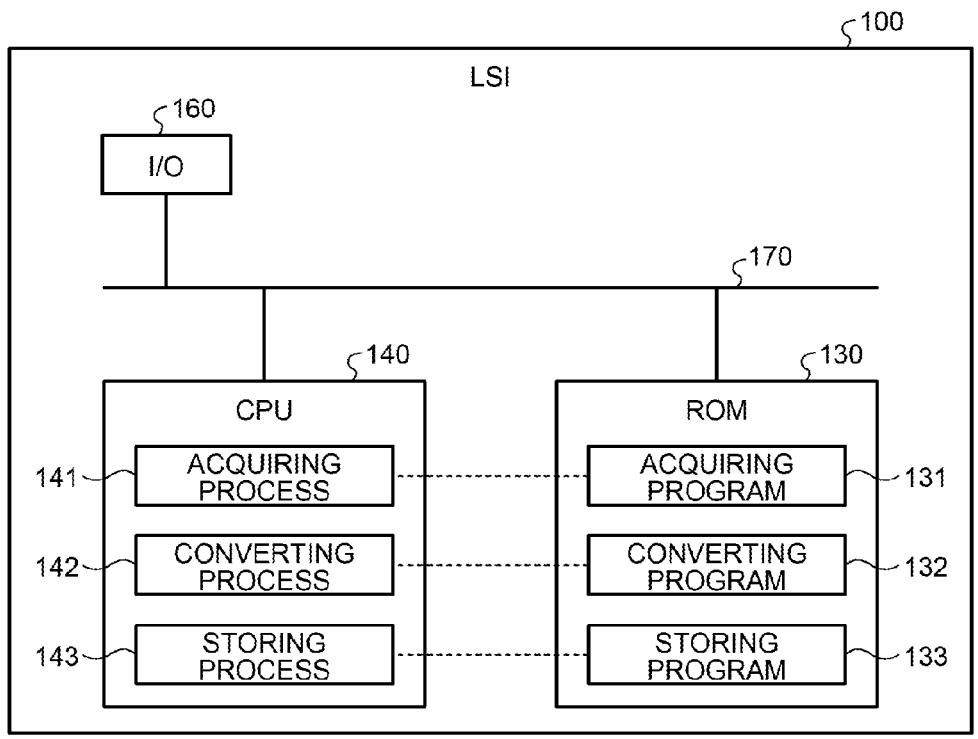
FIG. 9 is a diagram for explaining an example of an LSI that executes an information processing program.

There are described the case where the MPU 1 according to the first embodiment and the MPUs 1a to 1c according to the second embodiment realize various processes by using hardware. However, the embodiments are not limited to this; alternatively, the processes can be realized by causing a large-scale integration (LSI) to execute a program prepared in advance. An example of an LSI that executes an information processing program for converting an encrypted initial value into a value which is reversibly convertible and is independent of a cipher key and storing the converted value in a memory is explained below with reference to FIG. 9. FIG. 9 is a diagram for explaining an example of an LSI that executes an information processing program.

In an LSI 100 illustrated in FIG. 9, a ROM 130 and a CPU 140 are connected by a bus 170. Furthermore, in the LSI 100, an input-output device (I/O) 160, which performs transmission and reception of information with an external semiconductor memory, a PC, and an STB, is connected to the bus 170.

An acquiring program 131, a converting program 132, and a storing program 133 are held in the ROM 130 in advance. In the example illustrated in FIG. 9, the CPU 140 reads out the programs 131 to 133 from the ROM 130, and executes the read programs 131 to 133, so that the programs 131 to 133 work as an acquiring process 141, a converting process 142, and a storing process 143, respectively. Incidentally, the processes 141 to 143 fulfill the same functions as the units 7 to 10 illustrated in FIG. 1. Furthermore, the processes 141 to 143 can be configured to fulfill the same functions as the MPUs 1a to 1c according to the second embodiment.

According to one aspect of the present invention, the technology discussed in the present application makes it difficult to analyze a cipher key and enhances tamper resistance.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a first encrypting unit that generates an encrypted value by encrypting a value with a predetermined cipher key;
a second encrypting unit that generates an encrypted initial data by encrypting an initial data with the predetermined cipher key when the second encrypting unit receives the initial data;
a calculating unit that calculates a first encrypted exclusive ORed information by exclusive ORing the encrypted value and the encrypted initial data, the encrypted initial data being stored at the time of initialization of a storage device in which a data encrypted by the second encrypting unit is stored;
a storing unit that stores the calculated first encrypted exclusive ORed information in the storage device, the calculating unit generating first encrypted exclusive ORed information corresponding to a memory address of the storage device in which the storing unit stores the calculated first encrypted exclusive ORed information; and
a decrypting unit that calculates a second encrypted exclusive ORed information by exclusive ORing the first exclusive ORed information and the encrypted initial data, and decrypts the second encrypted exclusive ORed information with the predetermined cipher key.

2. An information processing method comprising:
generating an encrypted value by encrypting a value with a predetermined cipher key;
generating an encrypted initial data by encrypting an initial data with the predetermined cipher key;
calculating a first encrypted exclusive ORed information by exclusive ORing the encrypted value and the encrypted initial data, the encrypted initial data being stored at the time of initialization of a storage device;
storing the calculated first encrypted exclusive ORed information in the storage device, the first encrypted exclusive ORed information being generated so as to correspond to a memory address of the storage device;
calculating a second encrypted exclusive ORed information by exclusive ORing the first exclusive ORed information and the encrypted initial data; and
decrypting the second encrypted exclusive ORed information with the predetermined cipher key.

3. A non-transitory computer readable storage medium having stored therein an information processing program causing a computer to execute a process, the process comprising:
    generating an encrypted value by encrypting a value with a predetermined cipher key;
    generating an encrypted initial data by encrypting an initial data with the predetermined cipher key;
    calculating a first encrypted exclusive ORed information by exclusive ORing the encrypted value and the encrypted initial data, the encrypted initial data being stored at the time of initialization of a storage device;
    storing the calculated first encrypted exclusive ORed information in the storage device, the first encrypted exclusive ORed information being generated so as to correspond to a memory address of the storage device;
    calculating a second encrypted exclusive ORed information by exclusive ORing the first exclusive ORed information and the encrypted initial data; and
    decrypting the second encrypted exclusive ORed information with the predetermined cipher key.

\* \* \* \* \*